Patented Dec. 1, 1925.

1,564,181

UNITED STATES PATENT OFFICE.

JOHN LEONARD KELLOGG, OF BATTLE CREEK, MICHIGAN, ASSIGNOR TO KELLOGG COMPANY, OF BATTLE CREEK, MICHIGAN, A CORPORATION OF DELAWARE.

MANUFACTURE OF BRAN FOOD.

No Drawing.   Application filed October 26, 1922. Serial No. 597,176.

*To all whom it may concern:*

Be it known that I, JOHN L. KELLOGG, a citizen of the United States, residing at Battle Creek, in the county of Calhoun and State of Michigan, have invented certain new and useful Improvements in the Manufacture of Bran Food, of which the following is a full, clear, and exact description, such as will enable other skilled in the art to which it appertains to make and use the same.

My invention relates to the production of a bran food for use particularly in cases of diabetes which will have the appetizing, palatable, laxative and other advantageous qualities of brans made with the addition of sugar or saccharine flavoring, but being free of such sugars will be especially suitable for use by persons suffering from diabetes and allied troubles.

My invention consists briefly in the production of a bran food from bran and malt or other agent containing enzymes which have the power of converting starches into maltose or malt sugar.

In order that the nature of my invention and its scope may be fully ascertained, I shall first describe in detail the mode in which I at present prefer to carry my invention into practice and then particularly define the boundaries of the invention in the claims.

In the present production of my improved bran food, I prefer first to select a very good grade of thoroughly cleaned winter wheat bran, of which I take 100 pounds and mix with, by preference, about fifteen pounds of finely ground barley malt, which may be ground with or without the hull. In place of the malt, I may use any other suitable enzymes which have the power to convert starches into maltose or malt sugar as before stated.

To the mixture of bran and malt is added and with it thoroughly mixed from about ten to twenty gallons of pure water.

The entire mass is then, by preference, enclosed in a heating chamber where it is subjected to a temperature of about 155° or 158° F. for from about thirty minutes to several hours according to the amount or degree of conversion desired, whereby the carbohydrates in the bran are partially converted by the enzymes in the malt into maltose or malt sugars.

This process of conversion may also be performed in many other equivalent ways. For instance, extract of malt may be made and added to the bran before heating, in which case the enzymes in the malt act upon the starches in the bran to convert the same partially or wholly into maltose or malt sugars. Or, a thin paste may be made from finely ground barley malt heated to the proper temperature and mixed with the bran, the entire mass being then subjected to the proper temperature and for the required time to convert the starches into maltose or malt sugar as before described.

In addition to the above converting agents, there are many other well known agents containing enzymes which may be used with equal success in the above conversion of the bran carbohydrates into the maltose or malt sugar.

The heating of the mixture of bran, water and malt for conversion purposes, may be performed in an enclosed receptacle or chamber as before stated, or in the mixer where the malt, bran and water are mixed, by employing a steaming jacket on the outside of the mixer which will keep the mass warm while being mixed, or the mass may be enclosed in a rotary cooker which is slowly revolved and the temperature maintained therein either by a false jacket or by admitting live steam into the cooker or apparatus containing the mixture into direct contact with the mass.

The converting process is continued by maintaining the required temperature until the proper degree of conversion and flavoring is obtained.

In some cases salt is added to the bran with the ground malt or malt flour, to give the proper flavor to the product.

After the process of conversion is completed, the entire mass of bran, carbohydrates and malt sugars is thoroughly cooked by any suitable means.

For this cooking process, I prefer to use a rotary steam cooker or a spiral conveyor which is enclosed and through which a jet of steam is admitted while the mass is being carried through the conveyor. For thorough cooking in this way, I now find it requires about twenty to thirty minutes to cook the converted bran thoroughly and a steam pressure of about fifteen pounds. This period of cooking and degree of temperature however may be varied according to the results desired in each case.

The converted and cooked bran is now ready for drying, which process is performed, for example, by an ordinary hot air blast, until only about 10% or 20% of moisture remains in the bran.

The converted, cooked and dried bran is then by preference shredded as by means of the ordinary shredding rolls.

The shredded product is then by preference dried or toasted, for which purpose I may use ordinary toasting ovens or rotary ovens such as are commonly used in toasting ready-to-eat cereals, for example, that called toasted corn flakes.

Instead of shredding the converted, cooked and dried bran, it is equally practicable to form the converted, cooked and dried bran, into flakes, by allowing it to stand and harden, then breaking the lumps into small pieces, and rolling the pieces into flakes, which may be finally dried or toasted as in the case of the shred formation.

Or the converted, cooked and dried bran may be ground in an attrition mill and toasted or dried in powdered form, and either the powdered or shredded product made into biscuits, which may be dried or toasted to form the final product.

By this process, I obtain a converted and thoroughly cooked bran which is free from the ordinary sugar or saccharine flavoring, and is therefore particularly adapted for use by those suffering from diabetes or similar ills, while at the same time it possesses all the appetizing, palatable and laxative qualities of the cooked and flavored bran, which I have described in prior applications for patents filed by me.

In thus describing the specific method by which I prefer to carry my process into practice, the specific product thus produced, and various modifications both of the process and product, I do not mean to confine my invention to such specific processes and products; but for a definition of the spirit and scope of my invention, reference is to be had to the following claims.

I claim as my invention:

1. A process for the preparation of a bran food, which comprises moistening a mixture of bran and an agent containing diastatic enzymes, converting the bran starches of the moistened mixture into malt sugars by subjecting the same to heat, and then cooking, drying, disintegrating and toasting the converted product.

2. A process for the preparation of a bran food, which comprises moistening a mixture of bran and malt, converting the bran starches of the moistened mixture into malt sugars by subjecting the same to heat, and then cooking, drying, disintegrating and toasting the converted product.

3. A process for the preparation of a bran food, which comprises moistening a mixture of bran and malt, converting the bran starches of the moistened mixture into malt sugars by heating at a temperature of about 155° F., and then cooking, drying, disintegrating and toasting the converted product.

4. A process for the preparation of a bran food, which comprises moistening a mixture of bran and malt, converting the bran starches of the moistened mixture into malt sugars by means of heat, cooking the converted mixture by means of steam at a temperature of about 230° F., and then drying, disintegrating and toasting.

5. A process for the preparation of a bran food, which comprises moistening a mixture of bran and malt, converting the bran starches of the moistened mixture into malt sugars by heating to a temperature of about 155° F. for a period of from one-half hour to three hours, cooking the converted mixture by means of steam under about fifteen pounds pressure, and then drying, disintegrating and toasting.

6. A bran food consisting preponderantly of bran, malt and malt sugars in a cooked, dried and disintegrated condition.

7. A bran food consisting preponderantly of bran, malt and malt sugars in a cooked, dried, disintegrated and toasted condition.

8. A bran food consisting preponderantly of bran, malt and malt sugars in a cooked, dried, shredded and toasted condition.

In testimony whereof I affix my signature.

JOHN LEONARD KELLOGG.